United States Patent [19]

Kuwata et al.

[11] Patent Number: 5,533,034
[45] Date of Patent: Jul. 2, 1996

[54] HIGH SPEED DATA TRANSFER DEVICE HAVING IMPROVED EFFICIENCY

[75] Inventors: Yuri Kuwata, Hyogo; Ichiro Okabayashi; Tetsuji Kishi, both of Osaka, all of Japan

[73] Assignee: Matsushita Electric Industrial Co., Ltd., Osaka, Japan

[21] Appl. No.: 79,591

[22] Filed: Jun. 22, 1993

[30] Foreign Application Priority Data

Jun. 26, 1992 [JP] Japan ................................. 4-168846

[51] Int. Cl.⁶ ................................................ H04L 1/16
[52] U.S. Cl. ........................................... 371/32; 371/31
[58] Field of Search ................................. 371/32, 31, 33; 340/825.06, 825.07; 370/94.1, 94.3

[56] References Cited

U.S. PATENT DOCUMENTS

| | | | |
|---|---|---|---|
| 4,352,103 | 9/1982 | Slater | 371/33 |
| 4,905,234 | 2/1990 | Childress et al. | 371/33 |
| 4,908,828 | 3/1990 | Tikalsky | 371/32 |
| 5,036,518 | 7/1991 | Tseung | 371/32 |
| 5,109,384 | 4/1992 | Tseung | 371/32 |
| 5,216,675 | 6/1993 | Melliar-Smith et al. | 371/32 |

OTHER PUBLICATIONS

U.S. patent wapplication Ser. No. 07/848,848, filed Mar. 9, 1992, Kishi et al.

*Primary Examiner*—Roy N. Envall, Jr.
*Assistant Examiner*—Thomas E. Brown
*Attorney, Agent, or Firm*—Willian Brinks Hofer Gilson & Lione

[57] ABSTRACT

One data transmitter for transmitting a broadcast data onto an outside data bus and data receivers, whose number is "n", for individually receiving the transmitted broadcast data are provided. A single error signal line is connected in common to the data transmitter and each of the "n" data receivers. Each of the data receivers notifies an error detection to the data transmitter and the other data receivers via the error signal line with a wired OR connector when its own data receivers detects an error. Being notified of the error detection, the data transmitter re-transmits the data so that all of the data receivers re-receive the data. Accordingly, re-transfer per one data at a broadcast transfer is contemplated.

12 Claims, 10 Drawing Sheets

HIGH SPEED DATA TRANSFER DEVICE HAVING IMPROVED EFFICIENCY

BACKGROUND OF THE INVENTION

This invention relates to a data transfer device having one data transmitter and a plurality of data receivers for receiving a broadcast data transmitted from the data transmitter.

In a multiprocessor system, which is recently being focused on as one of high speed computers, data transfer is frequently performed among processors. As a high-efficiency data transferring method in the multiprocessor system, there is known a batch transfer of an identical data from a data transmitter for one processor to data receivers for each of a plurality of processors, i.e. a broadcast transfer. Wherein, an immediate data re-transfer is necessary when an error is detected in the received data.

A conventional data transfer device controls, at the broadcast transfer, re-transferring operation, using an error detection resistor provided in each data receiver. When the data transmitter transmits a broadcast data onto a data bus, each data receiver receives individually the data on the data bus and checks individually whether an error is present in the received data. The data receiver which detects an error sets a flag at a set bit position in its own error detection register. The data transmitter reads sequentially the error detection registers in the respective data receivers via the data bus at every time when transmission of one data block composed of plural data is completed, not at every one data transfer. When the flag is set in any of the error detection registers of the data receivers, the block data which has been transmitted is re-transmitted. At this time, the data transmitter provides a re-receiving request signal to all the data receivers. Responding to the re-receiving request signal, each data receiver discards all the broadcast data of the block regarding the error detected in any of the data receivers so as to prepare for re-receiving the data block.

In the conventional data transfer device having the above error detection register, at a broadcast transfer, an error is checked only when transfer of one data block is completed, and the whole data block is re-transferred when an error is detected. This causes remarkably worse efficiency of data re-transfer and bars speedy transfer.

SUMMARY OF THE INVENTION

The present invention has its object of enhancing the efficiency of data re-transfer at the broadcast transfer.

To attain the above object, in this invention, the data transmitter and each data receiver respectively monitor on real time via a single error signal line an error detection in received data in all the data receivers and an error detection in received data in all the other data receivers in order to perform re-transfer per one data at the broadcast transfer.

In detail, a first data transfer device according to the present invention comprises one data transmitter for transmitting a broadcast data, a plurality of data receivers each having functions of individually receiving a broadcast data transmitted by the data transmitter and of checking individually whether an error is present in the received data, and a single error signal line connected in common to the data transmitter and each data receiver. In addition, each of the data receivers has functions of discarding the received data and notifying an error detection concurrently to the data transmitter and the other data receivers via the error signal line when an error is detected in the received data, and of discarding the received data when an error detection is notified from any of the other data receivers. Also the data transmitter has a function of, when an error detection as to a transmitted broadcast data is notified from any of the data receivers, re-transmitting the broadcast data so that the broadcast data is re-received by all of the data receivers.

According to the first data transfer device, each of the data receivers not only discards the received data when an error is detected in its own received data, but also discards its own correct received data when any of the other data receivers detects an error in the received data. Thereby, all the data receivers immediately prepare for re-receiving the broadcast data when any of the data receivers detects an error. On the other hand, being notified of an error detection as to the transmitted broadcast data from any of the data receivers, the data transmitter re-transmits the data immediately. Thus, the re-transfer per one data at the broadcast transfer is contemplated, with a result of high data retransfer efficiency.

The data transmitter preferably includes memory means for storing a data to be transmitted; code adding means for adding an error checking code to a data fetched from the memory means; transmitting means for temporarily holding a data to which an error checking code is added by the code adding means and for transmitting the data as a broadcast data; and transmitting control means for controlling data fetch from the memory means so as to inhibit from fetching a next data and controlling operation of the transmitting means so that the data held in the transmitting means is re-transmitted when an error detection as to the data which is transmitted by the transmitting means is notified from any of the data receivers. Accordingly, the broadcast data which has been transmitted and to which an error checking code is added is temporarily held in the data transmitter for preparing for re-transmission, thus high-speed data re-transmission is contemplated.

Preferably, the data transmitter is provided with receiving means for receiving a broadcast data transmitted by the data transmitter and temporarily holding the received data; error checking means for checking whether an error is present in the received data and for outputting an error detection signal when an error is detected; memory means for storing the received data; receiving control means for controlling transit of the received data from the receiving means to the memory means so as to inhibit the received data from being stored and outputting an error judgment signal when the error checking means outputs the error detection signal; and connecting means for driving the error signal line so as to notify an error detection concurrently to the data transmitter and all of the data receivers when the receiving control means outputs an error judgment signal, and providing a re-receiving request signal to the receiving control means when the error signal line is driven by any of the other data receivers, wherein the receiving control means has a function of controlling transit of a received data from the receiving means to the memory means so as to inhibit the received data from being stored when the re-receiving request signal is received from the connecting means even though the error checking means does not output an error detection signal. Accordingly, re-receiving of the broadcast data in each data receiver is properly performed.

The data transfer device further comprises a pull-up resistor intervened between the error signal line and a source line, wherein the connecting means in each of the data receivers including: a drive part for pulling down an electric potential of the error signal line when the receiving control means outputs the error Judgment signal; and an input part for generating a re-receiving request signal to the receiving control means when the electric potential of the error signal line is pulled down. According to this construction, when none of the data receivers detects any error in the received data, the electric potential of the error signal line is maintained to HIGH because of the pull-up resistor intervened. While, when any of the data receivers detects an error, the electric potential of the error signal line is pulled down with wired OR connection. The pull-down of the potential of the error signal line triggers generation of a re-receiving request signal in each data receivers. With the construction that the re-transfer of the broadcast data is controlled according to the potential of the single error signal line, a hardware for controlling re-transfer is simplified.

Preferably, the data transmitter has functions of transmitting a test data as a broadcast data, and of re-transmitting the test data so that the test data is re-received by all of the data receivers when an error detection as to the transmitted data is notified from any of the data receivers. Accordingly, test results of the plural data receivers are obtained at one time via the single error signal line by the broadcast transfer of the test data, thus enhancing the test speed of the data transfer device.

The data transmitter preferably has a function of judging that a permanent failure is present in the data transfer device when re-transmission of the test data is counted to a set number of times. Thus, a permanent failure in the data transfer device is detected in high speed, apart from a sudden failure due to a crosstalk and the like.

A second data transfer device according to the present invention, comprises: one data transmitter for transmitting a broadcast data; receiving parts, whose number is "n", each including a plurality of data receivers each having a function of receiving individually a broadcast data transmitted by the data transmitter and checking individually whether an error is present in the received data, and a single error signal line connected in common to the data receivers; integration means, whose number is the "n", each connected to the error signal line of each of the "n" receiving parts; and a single error integration signal line connected in common to the data transmitter and each of the "n" integration means, wherein each of the data receivers has functions of discarding the received data and notifying an error detection concurrently to the data transmitter and the other data receivers via the error signal lines, the error integration signal line and the "n" integration means when an error is detected in the received data, and of discarding the received data when an error detection is notified from any of the other data receivers, and the data transmitter has a function of re-transmitting the data so that the broadcast data is received by all of the data receivers when an error detection as to the transmitted broadcast data is notified from any of the data receivers.

According to the second data transfer device, each data receiver monitors on real time an error detection in the received data in the other data receivers in the same receiving part via the single error signal line in each of the "n" receiving parts. Also, each data receiver monitors on real time an error detection in the data receivers in the other receiving parts via the error signal line, the error integration signal line and the integration means. Thereby, when at least one data receiver detects an error in the received data, all the data receivers in all the receiving parts immediately discard the received data for preparing for data re-receiving. On the other hand, being notified of the error detection as to the transmitted data from any of the data receivers, the data transmitter immediately re-transmits the data. Thus, in the construction that many data receivers are divided into the "n" receiving parts, re-transfer per one data at the broadcast transfer is contemplated, enhancing the data re-transfer efficiency.

Each of the "n" receiving parts preferably includes a pull-up resistor intervened between the error signal line and a power source line, and each of the data receivers includes a drive part for pulling down, when an error is detected in the received data, an electric potential of one corresponding error signal line, and an input part for generating a re-receiving request signal when the electric potential of the corresponding error signal line is pulled down. Accordingly, in each of the "n" receiving parts, when none of the data receives in the receiving part detects any error in the received data, the potential of the error signal line is maintained to HIGH because of the pull-up resistor intervened. While, when any of the data receivers in the receiving part detects an error, the potential of the error signal line is pulled down to LOW with the wired OR connection. The pull-down of the potential of the error signal line triggers generation of a re-receiving request signal in each data receiver. With the construction that re-receiving of the broadcast data is controlled according to the potential of the single error signal line in each of the "n" receiving parts, a hardware for re-receiving control is simplified.

The second data transfer device preferably comprises a pull-down resistor intervened between the error integration signal line and a grounding line, wherein each of the "n" integration means includes a first switching element for pulling up an electric potential of the error integration line when one corresponding error signal line of each of error signal lines of the "n" receiving parts is pulled down, and a second switching element for pulling down the electric potential of the corresponding error signal line when the electric potential of the error integration signal line is pulled up. With this construction, while the potentials of all of the "n" error signal lines are maintained to HIGH, the potential of the error integration signal line is maintained to LOW because of the pull-down resistor intervened. While, when at least one of the "n" error signal lines is pulled down the potential to LOW according to an error detection, the potential of the error integration signal line is pulled up to HIGH with the wired OR connection, with a result that the error detection is notified to the data transmitter. In addition, the pull-up of the potential of the error integration signal line causes pull-down of the potentials of all of the error signal lines, and triggers generation of a re-receiving request signal in all the data receivers in all the receiving parts. According to the construction which controls the re-transfer of the broadcast data according to the potential of the single error integration signal line which is wired-OR-connected to each error signal line of the "n" receiving parts, the hardware for the re-transfer control is simplified.

A data transferring method according to the present invention for transferring a broadcast data from one data transmitter to a plurality of data receivers, comprising the steps of: transmitting a broadcast data from the data transmitter; receiving individually the transmitted broadcast data by the plural data receivers; checking whether an error is present in the received broadcast data by each of the plural data receivers individually; notifying, when any of the data receivers detects an error in the received data, an error detection concurrently to the data transmitter and all of the other data receivers via a single error signal line; and re-transmitting the broadcast data from the data transmitter so that the broadcast data regarding the detected error is re-received by all the data receivers.

According to the data transferring method, being notified of an error detection as to the transmitted broadcast data from any of the data receivers via the error signal line, the data transmitter immediately re-transmits the data. On the other hand, each of the data receivers re-receives the broadcast data when any of the other data receivers detects an error in the received data, as well as when its own data receiver detects an error in the received data. Thereby, the re-transfer per one data at the broadcast transfer is contemplated, with a result of high-speed data re-transfer.

The data transferring method preferably comprises the step of storing a received data in each of the data receivers when none of the data receivers detects an error in the received data. Accordingly, the broadcast data is continually, properly received.

The data transferring method preferably comprises the step of discarding a received data in all of the data receivers when none of the data receivers detects an error in the received data. Accordingly, each of the data receivers discards a correct received data of its own to prepare for re-receiving the broadcast data when any of the other data receivers detects an error in the received data even when no error is detected in the own data receiver. Thus, ensured is a proper re-receiving of the broadcast data in each data receiver.

PREFERRED EMBODIMENTS OF THE PRESENT INVENTION

Description is made below about data transfer devices according to the preferred embodiments of the present invention, with reference to accompanying drawings.
(FIRST EMBODIMENT)

Figure 1:
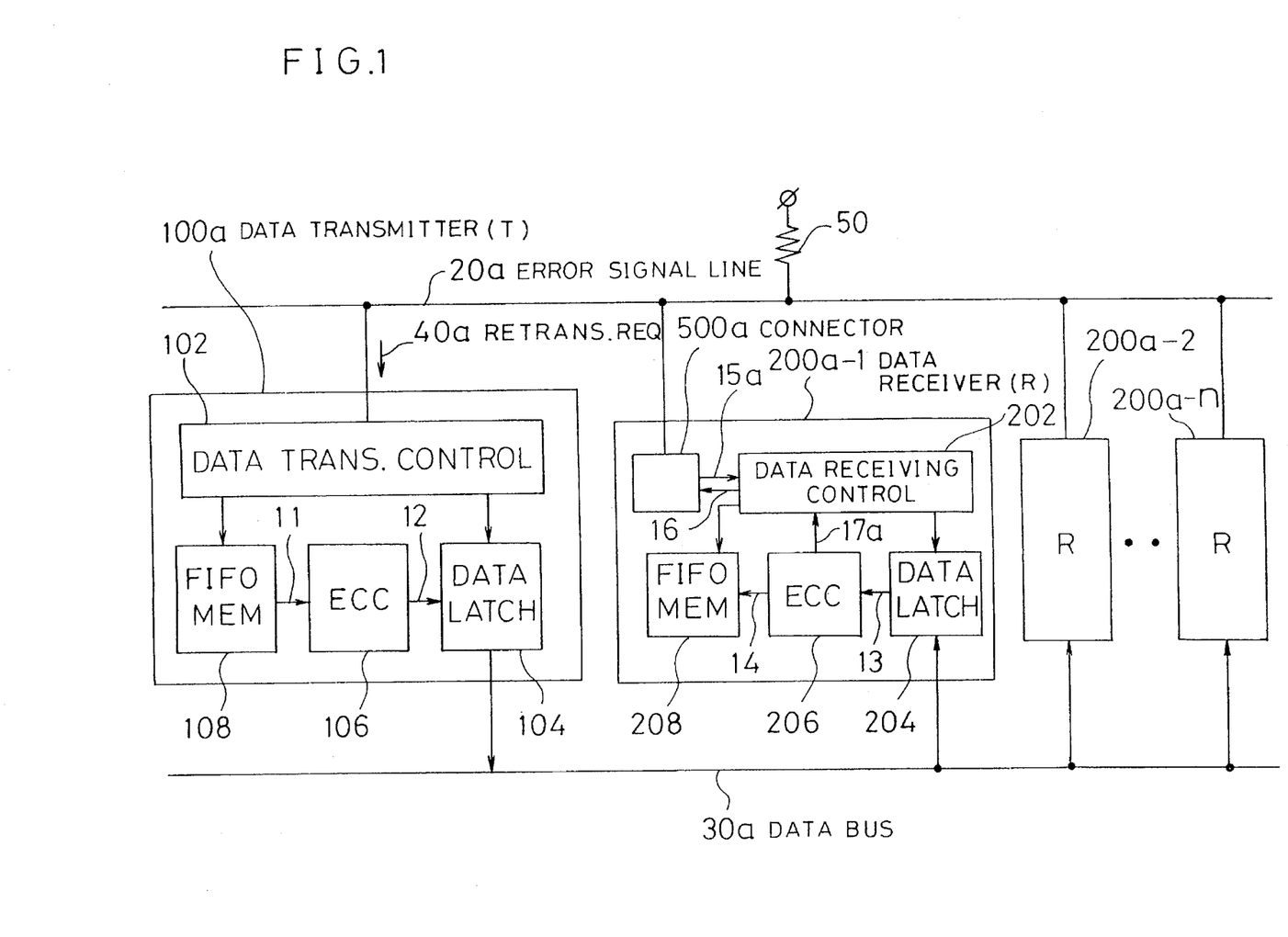
FIG. 1 is a block diagram showing a construction of a data transfer device according to a first embodiment of the present invention.

FIG. 1 is a block diagram showing a construction of a data transfer device according to the first embodiment of the present invention. In FIG. 1, reference numeral 100a designates a data transmitter for transmitting a broadcast data onto an outside data bus 30a. 200a-1–200a-n designate data receivers, whose number is "n", for individually receiving a broadcast data on the outside data bus 30a. 20a designates a single error signal line connected in common to the data transmitter 100a and each of the "n" data receivers 200a-1–200-n. The error signal line 20a is connected to a power source line via a pull-up resistor 50.

The data transmitter 100a includes a transmitting controller 102, a data latch 104, an ECC circuit 106 and a FIFO memory 108. The FIFO memory serves as memory means in which a data to be transmitted is stored. The ECC circuit 106 serves as code adding means for adding an error checking code to a data fetched from the FIFO memory 108. The data latch 104 serves as transmitting means for temporarily holding a data to which an error checking code is added and for transmitting the data onto the outside bus 30 as a broadcast data. The transmitting controller 102 controls a fetch address (FIFO pointer) of a data from the FIFO memory 108 and operation of the data latch 104. Reference numerals 11 and 12 designate inside data buses which serves as data transfer paths among the three circuit blocks 104–108 in the data transmitter 100a.

Each of the "n" data receivers 200a-1–200a-n includes a receiving controller 202, a data latch 204, an ECC circuit 206, a FIFO memory 208 and a wired OR connector 500a. The data latch 204 serves as receiving means for receiving a broadcast data which the data transmitter 100a transmits onto the outside data bus 30a and for temporarily holding the received data. The ECC circuit 206 serves as error checking means for checking whether an error is present in a received data based on an error checking code and for supplying an error detection signal 17a to the receiving controller 202 when an error is detected. The FIFO memory 208 serves as memory means for storing a received data. The receiving controller 202 controls operation of the data latch 204 and read address (FIFO pointer) of a data to the FIFO memory 208. Also, the receiving controller 202 supplies an error judgment signal 16 to the wired OR connector 500a when an error detection signal 17a is received from the ECC circuit 206. The wired OR connector 500a of a certain data receiver (200a-1, for example) is a circuit which pulls down an electric potential of the error signal line 20a to LOW so as to notify an error detection concurrently to the data transmitter 100 and all of the other data receivers (200a-2–200a-n, for example) when an error judgment signal 16 is received from the receiving controller 202, and provides a re-receiving request signal 15a to the receiving controller 202 when any of the other data receivers (200a-2, for example) pulls down the potential of the error signal line 20a to LOW. On the other hand, LOW potential of the error signal line 20a is supplied as a re-transmitting request signal 40a to the transmitting controller 102 of the data transmitter 100a.

Receiving the re-transmitting request signal 40a, the transmitting controller 102 stops updating the FIFO pointer so as to inhibit fetch of a next data from the FIFO memory 108 on a transmitting side, and makes the data latch 104 on the transmitting side retransmit a held data. On the other hand, receiving an error detection signal 17a or a re-receiving request signal 15a, the receiving controller 202 controls transit of a received data from the data latch 204 to the FIFO memory 208 on a receiving side so as to inhibit storage of a received data held in the data latch 204 on the receiving side. In detail, the receiving controller 202 in each data receiver 200a-1–200a-n stops updating the FIFO pointer so as to discard the received data in each of them. Thereby, the broadcast data re-transmitted from the data transmitter 100a is re-received by all of the "n" data receivers 200a-1–200a-n.

When the broadcast data transmitted from the data transmitter 100a is correctly received by all of the data receivers 200a-1–200a-n, each received data is stored. Namely, only when the receiving controller 202 receives neither the error checking signal 17a nor the re-receiving request signal 15a, a received data in the data latch 204 on the receiving side is stored in the FIFO memory 208 on the receiving side and the FIFO pointer is updated. The data transmitter 100a starts transmitting a next broadcast data.

Figure 2:
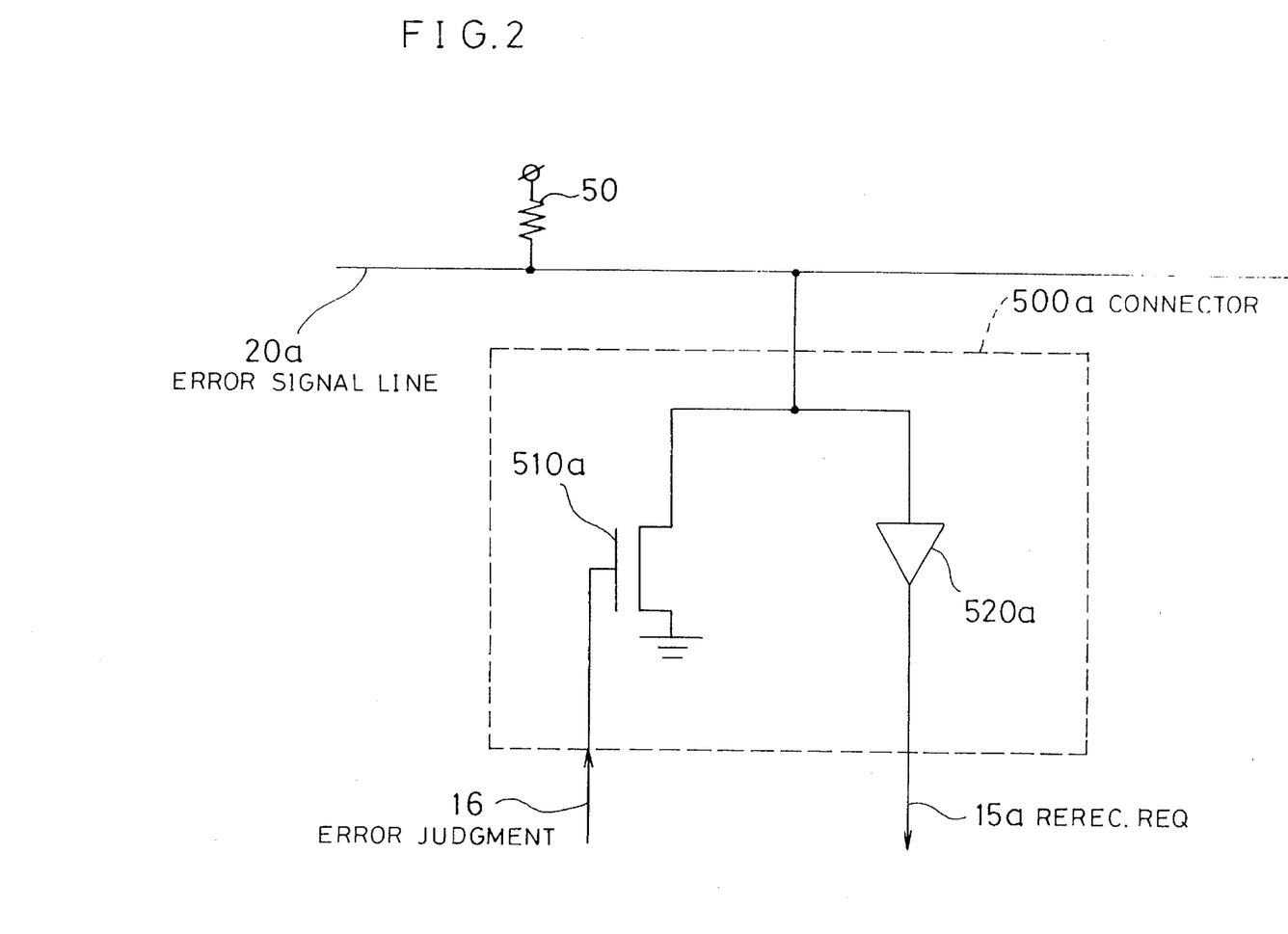
FIG. 2 is a circuit diagram showing an inside construction of a wired OR connector in FIG. 1.

FIG. 2 is a circuit diagram showing an inside construction of the wired OR connector 500a in a case a CMOS technology is applied to the data transfer device in FIG. 1. In FIG. 2, an N-type MOS transistor 510a composes a drive part for pulling down the potential of the error signal line 20a to LOW when the receiving controller 202 outputs an error judgment signal 16. In the N-type MOS transistor 510a, an error judgment signal 16 is applied to a gate, a source is connected to a grounding line, and a drain is directly connected to the error signal line 20a. A buffer circuit 520a composes an input part for generating a re-receiving request signal 15a to the receiving controller 202 when the potential of the error signal line 20 is pulled down.

Normally, the potential of the error signal line 20a is maintained to HIGH with the pull-up resistor 50 intervened. When the potential of an error judgment signal 16 from the receiving controller 202 becomes HIGH according to an error detection, the N-type MOS transistor 510a is conducted, with a result that the potential of the error signal line 20a is pulled down to LOW. When the potential of the error signal line 20a is pulled down to LOW, the buffer circuit 520a activates the re-receiving request signal 15a toward the receiving controller 202 to LOW. In case where a technology of bipolar transistor is applied to the data transfer device in FIG. 1, the N-type MOS transistor 510a of open drain type in the wired OR connection circuit 500a in FIG. 2 is exchanged to, for example, an NPN-type transistor of open collector type.

Figure 3:
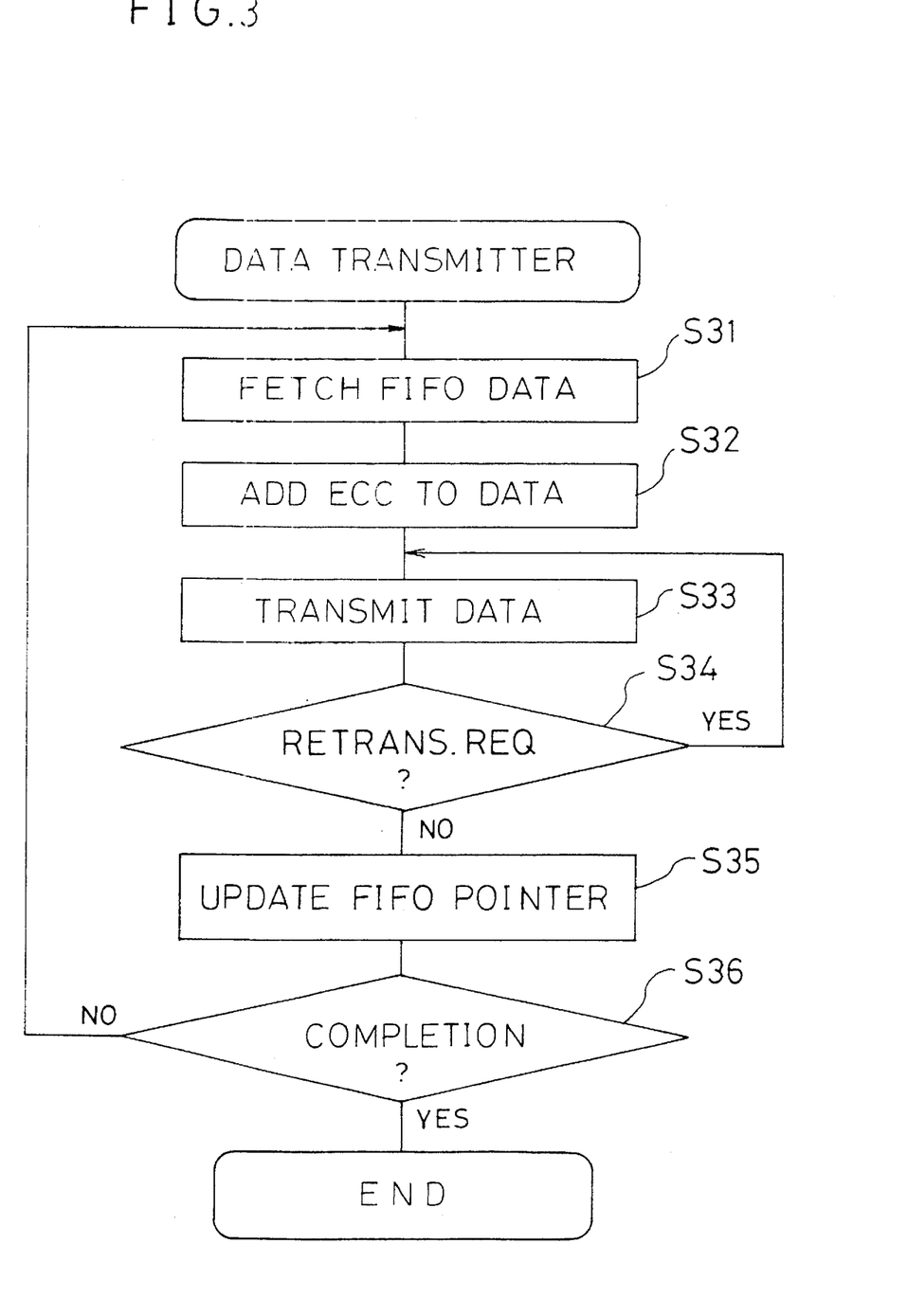
FIG. 3 is a flow chart showing operation of a data transmitter in FIG. 1.
Figure 4:
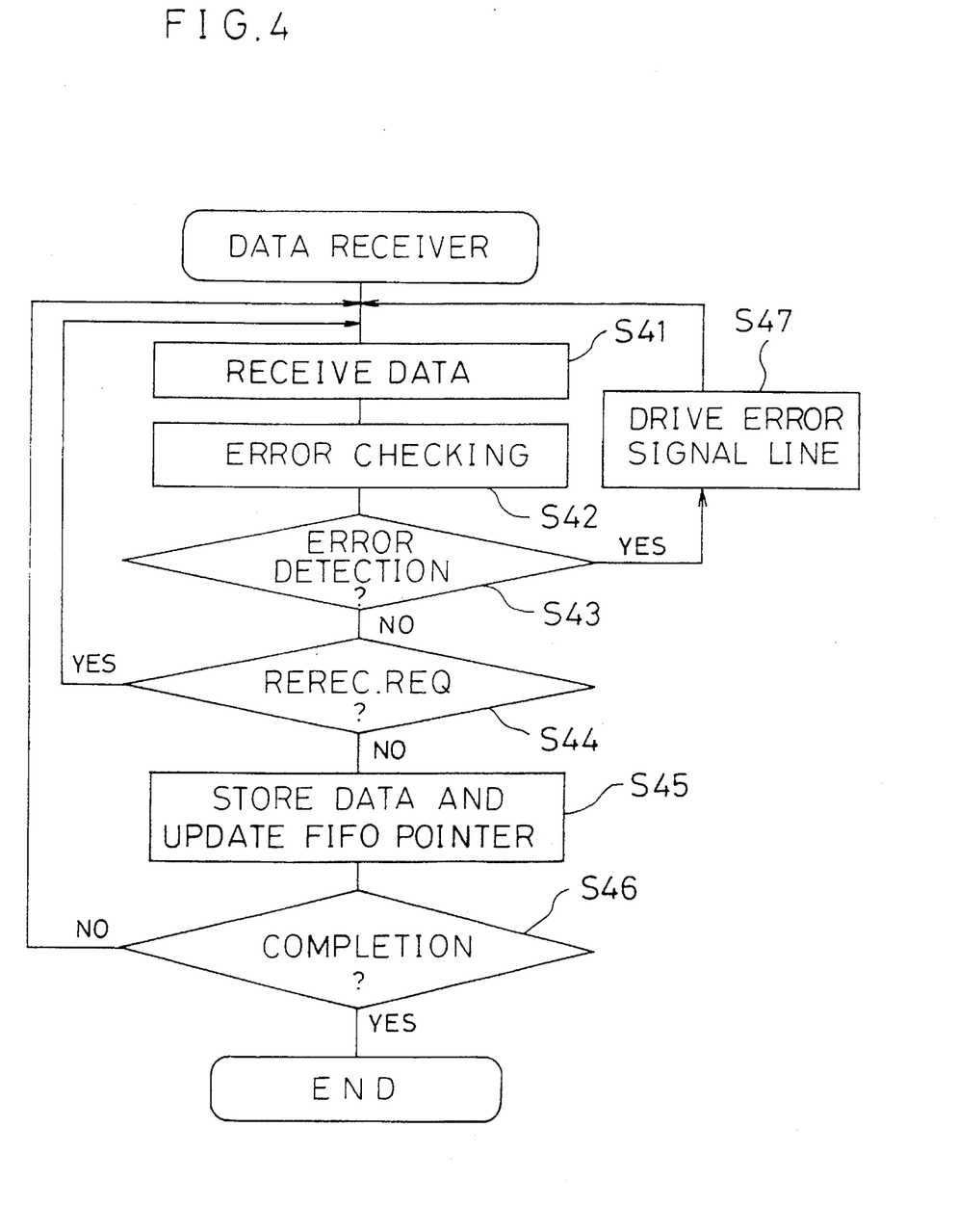
FIG. 4 is a flow chart showing operation of each data receiver in FIG. 1.

FIGS. 3 and 4 are flow charts respectively showing operations of the data transmitter 100a and of each of the "n" data receivers 200a-1–200a-n.

A shown in FIG. 3, the data transmitter 100a fetches a data from the FIFO memory 108 under control of the transmitting controller 102 at a step S31. The ECC circuit 106 adds an error checking code to the fetched data and the data is held in the data latch 104 at a step S32. The held data with the error checking code in the data latch 104 is transmitted onto the outside data bus 30a at a step S33. Then at a step S34, when a re-transmitting request signal 40a is received via the error signal line 20a, the routine returns to the step S33 to re-transmit the data held in the data latch 104.

When no re-transmitting request signal 40a is received, the routine proceeds to a step S35 to update the FIFO pointer. Then at a step S36, whether a next data is present is checked. When a next data is present, the routine returns to the step S31 to start retransmitting the next data.

On the other hand, as shown in FIG. 4, each of the "n" data receivers 200a-1–200a-n receives a transmitted data and the received data is held in the data latch 204 at a step S41. The data held in the data latch 204 is sent to the ECC circuit 206 to be checked whether an error is present at a step S42. When the ECC circuit detects an error, the routine proceeds from a step S43 to a step S47. At the step S47, an error checking signal 17a outputted from the ECC circuit 206 is provided to the receiving controller 202 and an error judgment signal 16 is provided to the wired OR connector 500a from the receiving controller 202. As a result, the potential of the error signal line 20a is pulled down to LOW. After the error signal line 20a is driven, the routine returns to the step S41 to start the re-transmitting operation.

Even if its own data receiver detects no error, when the error in the received data is detected by any of the other data receivers, the potential of the error signal line 20a is pulled down to LOW. As a result, the re-receiving request signal 15a is provided from its own wired OR connector 500a to the receiving controller 202. In this case, even through the routine proceeds from the step S43 to the step S44, the routine returns to the step S41, as well as in the case where its own data receiver detects an error, to start re-transmitting.

Only when the receiving controller 202 receives neither the error checking signal 17a nor the re-receiving request signal 15a, the routine proceeds to a step S45 to store the received data to the FIFO memory 208 and update the FIFO pointer. Then at a step S46, whether a next data is present is checked. When a next data is present, the routine returns to the step S41 to start the operation of receiving the next data.

As described above, according to the first embodiment, since the data transmitter 100a and each of the data receivers respectively monitor on real time via the single error signal line 20a an error detection in a received data in all of the data receivers 200a-1–200a-n and an error detection in the received data in all of the other data receivers, re-transfer per one data at the broadcast transfer is contemplated, thus enhancing an efficiency of data re-transfer.

(SECOND EMBODIMENT)

Figure 5:
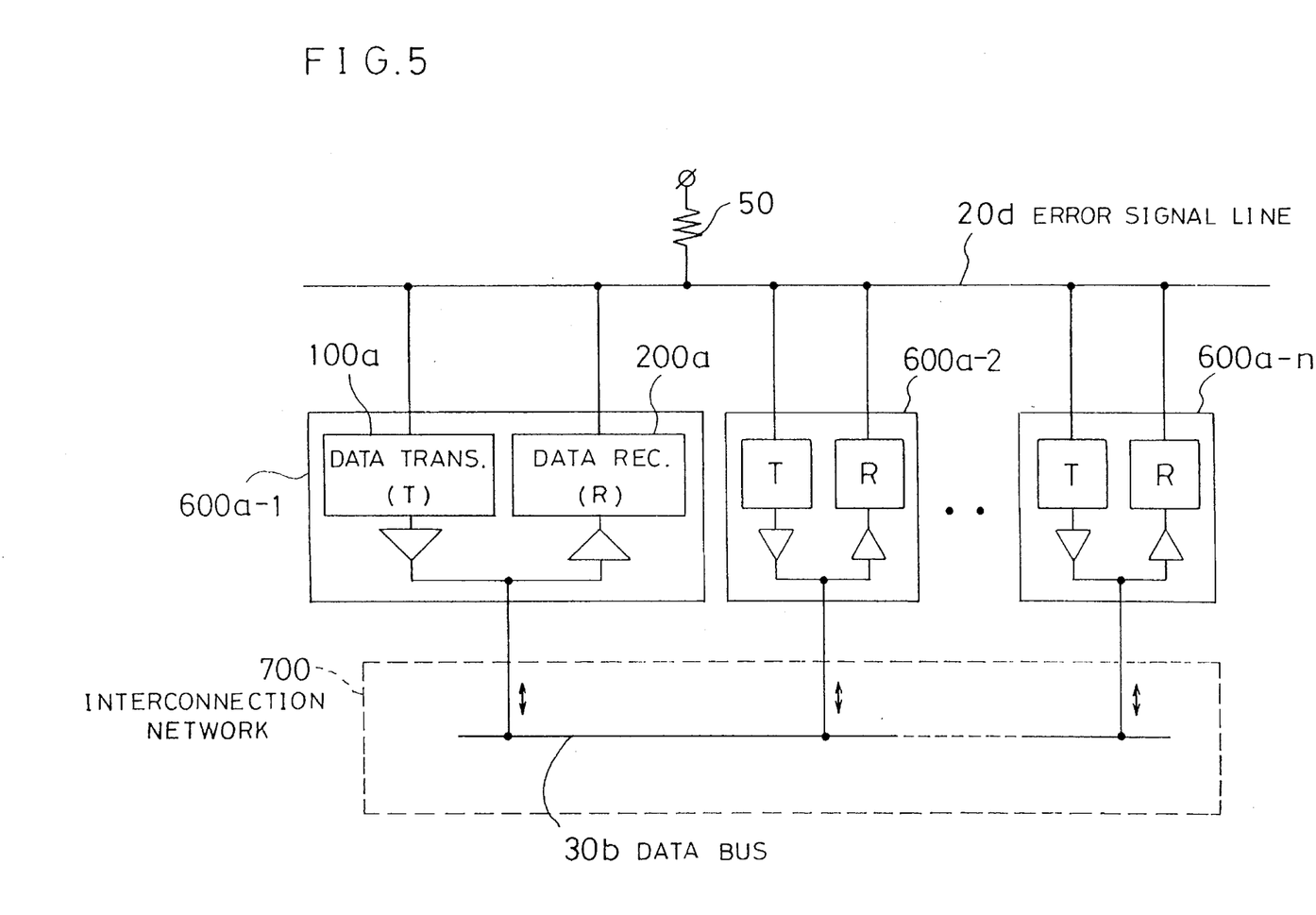
FIG. 5 is a block diagram showing a system construction having a plurality of data transfer devices according to a second embodiment of the present invention.

FIG. 5 is a block diagram showing a construction of a data transfer system having a plurality of data transfer devices according to the second embodiment of the present invention. In FIG. 5, reference numerals 600a-1–600a-n designate data transfer devices, whose number is "n", each having the data transmitter 100a and the data receiver 200a. The data transmitter 100a and the data receiver 200a have respectively the same constructions as those in the first embodiment. 700 designates an interconnection network which connects the "n" data transfer devices 600a-1–600a-n to one another. FIG. 5 shows a single outside data bus 30b in the interconnection network 700. 20d designates a single error signal line connected in common to the data transmitter 100a and the data receiver 200a in each data transfer device 600a-1–600a-n. The error signal line 20d is connected to the power source line via the pull-up resistor 50.

In the data transfer system in FIG. 5, when a broadcast data is transferred from one data transfer device 600a-1 to the other data transfer devices 600a-2–600a-n, the same data transferring operation as in the first embodiment is carried out with a combination of the data transmitter 100a in the data transfer device 600a-1 at a data source and the data receiver 200a in each data transfer device 600a-2–600a-n at data sinks. At this time, by the single error signal line 20d the re-transfer operation at an error occurrence is controlled. The same operation is carried out when another data transfer device is the data source.

(THIRD EMBODIMENT)

Figure 6:
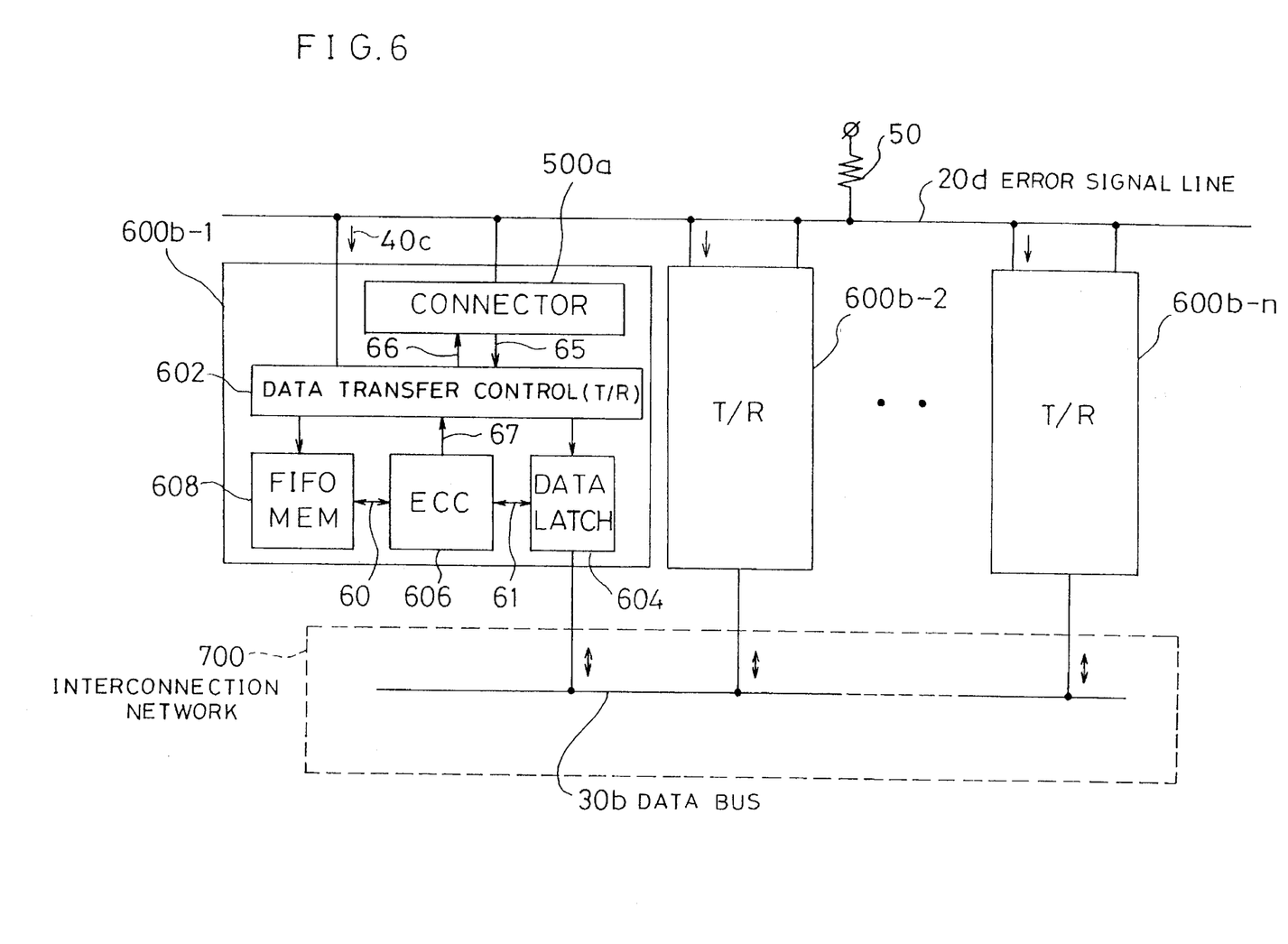
FIG. 6 is a block diagram showing a system construction having a plurality of data transfer devices according to a third embodiment.

FIG. 6 is a block diagram showing a construction of a data transfer system having a plurality of data transfer devices according to the third embodiment of the present invention. In FIG. 6, reference numerals 600b-1–600bn designate data transfer devices, whose number is "n", each having a data transmitting function and a data receiving function. 700 designates the interconnection network which connects the "n" data transfer devices 600b-1–600b-n to one another. FIG. 6 shows the single outside data bus 30b in the interconnection network 700. 20d designates a single error signal line connected in common to each data transfer device 600b-1–600b-n. The error signal line 20d is connected to the power source line via the pull-up resistor 50.

Each of the "n" data transfer devices 600b-1–600b-n includes a data transferring controller 602, a data latch 604, an ECC circuit 606, a FIFO memory 608 and the wired-OR connector 500a. Reference numerals 61 and 62 designate inside data buses which serve as two-way data transfer paths among the three circuit blocks 604–608.

Figure 7:
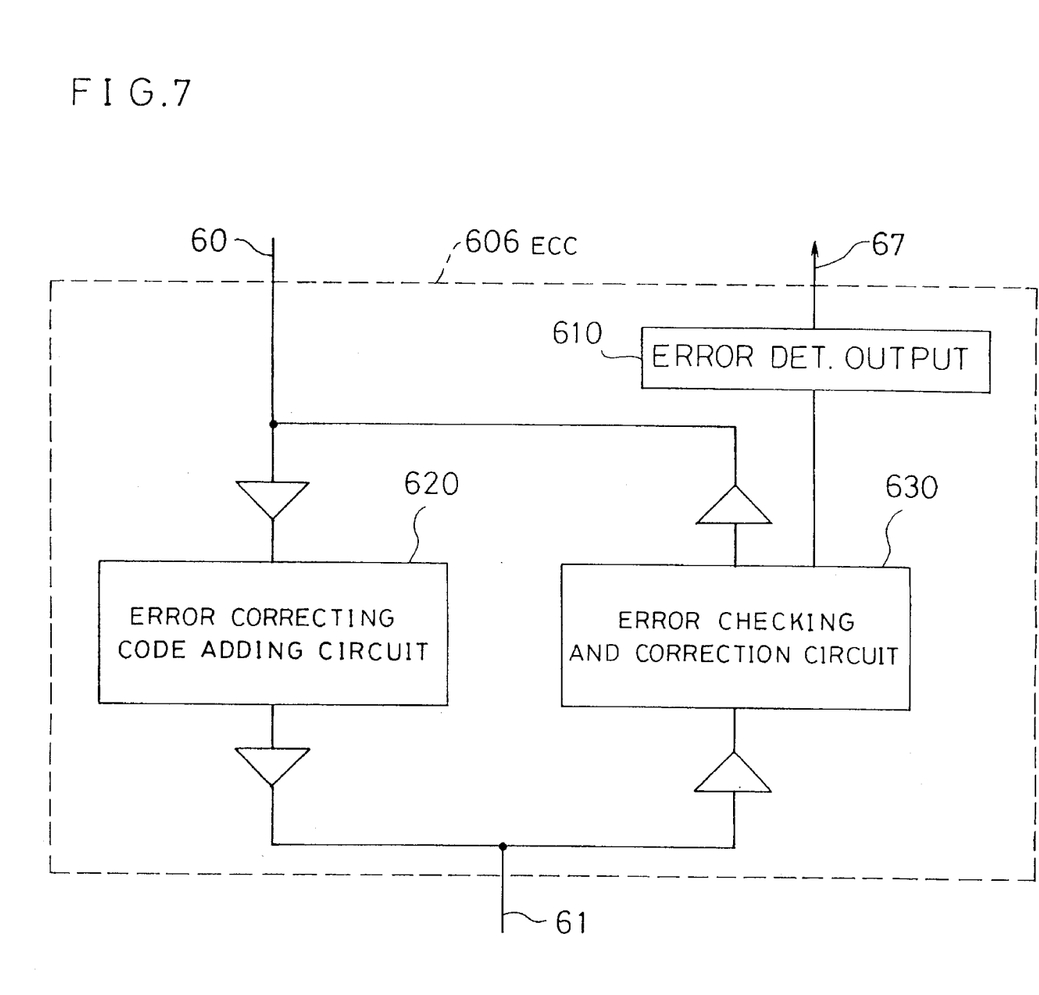
FIG. 7 is a block diagram showing an inside construction of an ECC circuit in FIG. 6.

The FIFO memory 608 is a memory for storing a data to be transmitted and holding a received data. The ECC circuit 606 includes, as shown in FIG. 7, an error correcting code adding circuit 620 for adding an error correcting code to a data fetched from the FIFO memory 608 and supplying it to the data latch 604, an error checking and correction circuit 630 for checking based on an error correcting code whether an error is present in a received data from the data latch 604 and for correcting an error as far as possible, and an error detection signal output circuit 610 for supplying an error detection signal 67 to the data transferring controller 602. The data latch 604 has a function of temporarily holding a data to which an error correcting code is added and transmitting the data onto the outside data bus 30b, and a function of receiving a data on the outside data bus 30b and temporarily holding the received data.

The data transferring controller 602 controls fetch address of a data from the FIFO memory 608 and read address of a data to the FIFO memory 608 and controls operation of the data latch 604. Also, the data transferring controller 602 supplies an error Judgment signal 66 to the wired OR connector 500a when an error detection signal 67 is received from the ECC circuit 606. The wired OR connector 500a pulls down the potential of the error signal 20d to LOW when an error judgment signal 66 is received from the data transferring controller 602, and provides a re-receiving request signal 65 to the data transferring controller 602 when the potential of the error signal line 20d is pulled down to LOW by any of the other data transfer devices. The LOW potential of the error signal line 20d is supplied to the data transferring controller 602 as a re-receiving request signal 40c.

In the data transfer system in FIG. 6, at a broadcast transfer of a data from one data transfer device 600b-1 to the other data transfer devices 600b-2–600b-n, the data transferring controller 602 in the data transfer device 600b-1 of a data source selects the transmitting operation, and the data transferring controller in each data transfer device 600b2–600b-n of data sinks select the receiving operation. Thereby, the same data transferring operation as in the first embodiment is carried out. At this time by the single error signal line 20d the re-transferring operation at an error occurrence is controlled. The same operation is carried out in case where another data transfer device is the data source.

(FOURTH EMBODIMENT)

Figure 8:
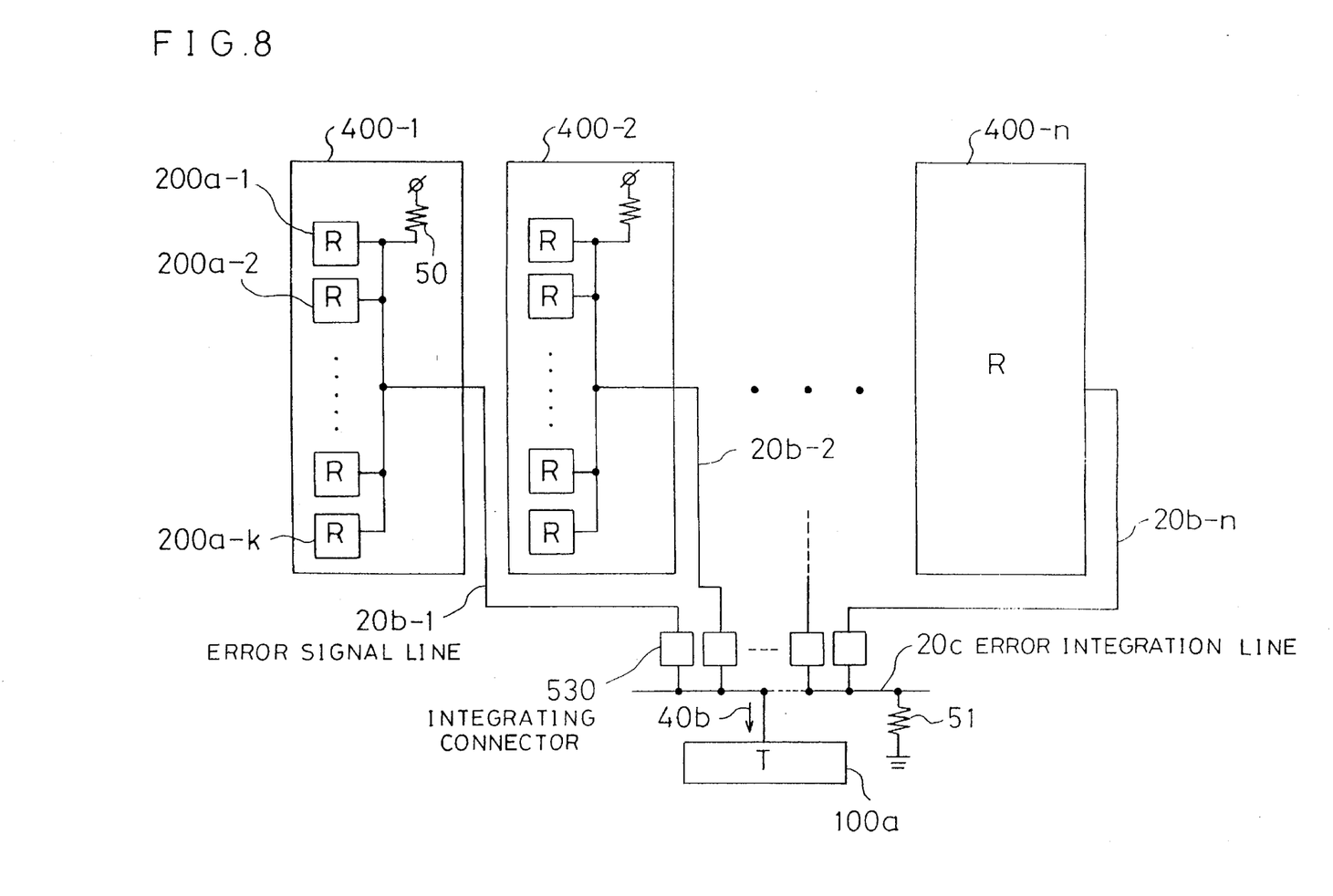
FIG. 8 is a block diagram showing a construction of a data transfer device according to a fourth embodiment of the present invention.

FIG. 8 is a block diagram showing a construction of a data transfer device according to the fourth embodiment of the present invention. In FIG. 8, reference numeral 100a designates the data transmitter for transmitting a broadcast data. 400-1–400-n designate receiving boards, whose number is "n", each on which data receivers 200a-1–200a-k whose number is "k" are provided. The data transmitter 100a and each of the data receivers 200a-1–200a-k have respectively the same constructions as those in the first embodiment. Data buses (not shown) are provided so that a broadcast data which the data transmitter 100a transmits is individually received by all of the data receivers on the "n" receiving boards 400-1–400-n.

Each of the "n" receiving boards 400-1–400-n includes a single error signal line 20b-1–20b-n connected in common to each of the "k" data receivers 200a-1–200a-k. The "n" error signal lines 20b-1 - 20b-n are respectively connected to the power source line via the pull-up resistor 50, and respectively connected to a single error integration signal line 20c via an error integrating connector 530. Further, the error integration signal line 20c is connected to the grounding line via a pull-down resistor 51. When the potential of the error integration signal line 20c is pulled up to HIGH, the HIGH potential is provided to the data transmitter 100a as a re-transmitting request signal 40b.

Figure 9:
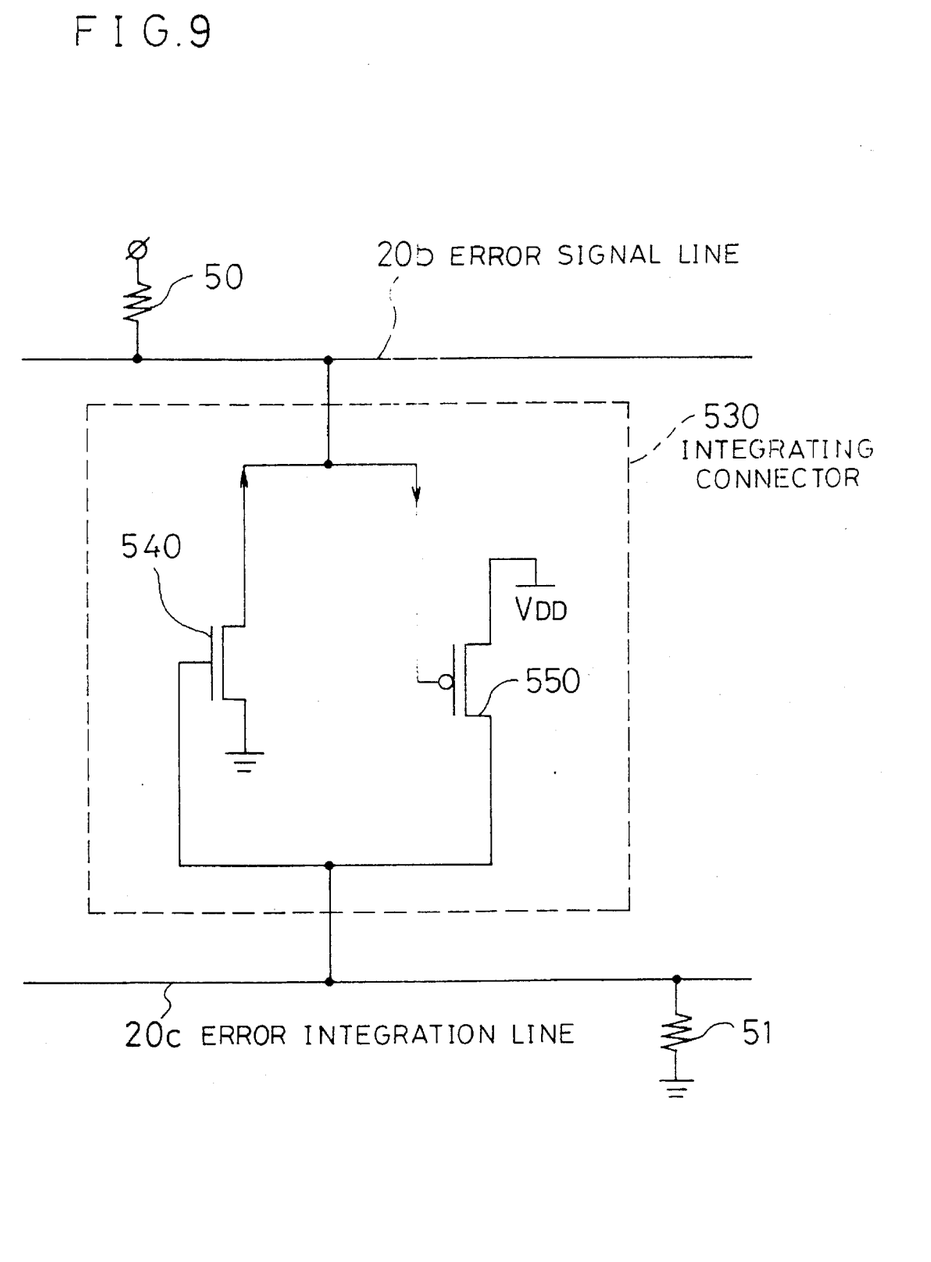
FIG. 9 is a circuit diagram showing an inside construction of an error integrating connector in FIG. 8.

FIG. 9 is a circuit diagram showing an inside construction of each of the "n" error integrating connector 530 in case where a CMOS technology is applied to the data transfer device in FIG. 8. In FIG. 9, a P-type MOS transistor 550 composes a first switching element for pulling up the potential of the error integration signal line 20c to HIGH when the potential of one corresponding error signal line 20b of the "n" error signal lines 20b-1–20b-n is pulled down to LOW. In the P-type MOS transistor 550, the error signal line 20b is connected to a gate, a source is connected to the power source line and a drain is directly connected to the error integration signal line 20c. An N-type MOS transistor 540 composes a second switching element for pulling down the potential of the corresponding one error signal line 20b to LOW when the potential of the error integration signal line 20c is pulled up to HIGH. In the N-type MOS transistor 540, the error integration signal line 20c is connected to a gate, a source is connected to the grounding line and a drain is connected to the error signal line 20b.

Normally, the potentials of all of the error signal lines 20b-1–20b-n are maintained to HIGH with the pull-up resistor 50 intervened, and the potential of the error integration signal line 20c is maintained to LOW with the pull-down resistor 51 intervened. When the potential of any one error signal line 20b is pulled down to LOW according to an error detection, the P-type MOS transistor 550 in the single error integrating connector 530 connected to the error signal line 20b is conducted, with a result that the potential of the error integration signal line 20c is pulled up to HIGH. Accordingly, a re-transmitting request signal 40b is provided to the data transmitter 100a. When the potential of the error integration signal line 20c is pulled up to HIGH, the N-type MOS transistors 540 in all of the error integrating connectors 530 are conducted, with a result that the potentials of all of the error signal lines 20b-1–20b-n are pulled down to LOW. Accordingly, an error detection in the received data in a certain data receiver is informed not only to the other data receivers in the same receiving board but also to the data receivers in all of the other receiving boards, thus each re-receiving request signal is generated. Thereby, re-transfer per one data at a broadcast transfer is contemplated, with the re-transferring efficiency enhanced.

In case where a technology of bipolar transistor is applied to the data transfer device in FIG. 8, the P-type MOS transistor 550 of open drain type in the error integrating connector 530 in FIG. 9 is exchanged, for example, to a PNP-type transistor of open collector type, and the N-type MOS transistor 540 of open drain type is exchanged, for example, to an NPN-type transistor of open collector type.

(FIFTH EMBODIMENT)

Figure 10:
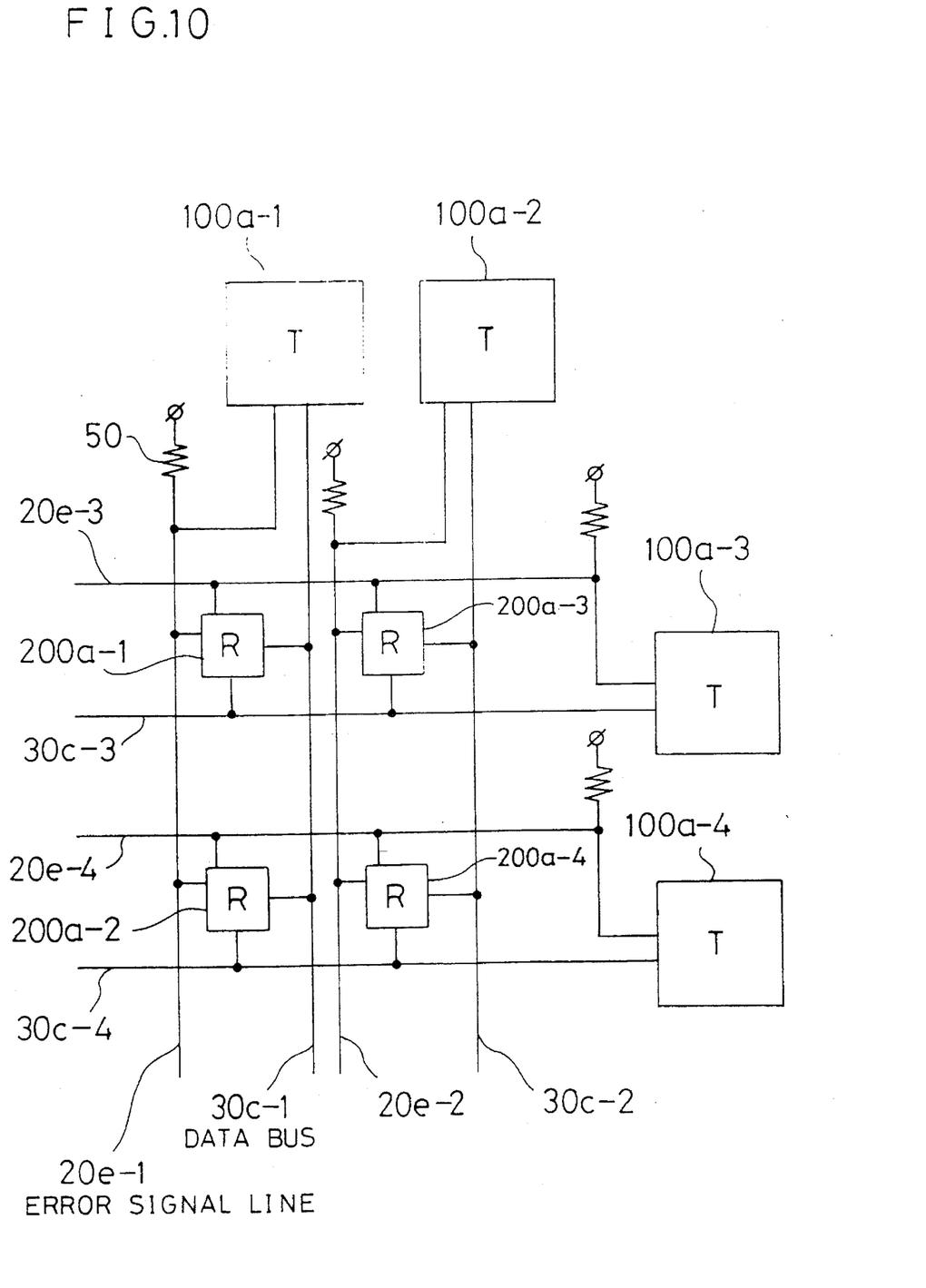
FIG. 10 is a block diagram showing a construction of a data transfer system according to a fifth embodiment of the present invention.

FIG. 10 is a block diagram showing a data transfer system having a construction of crossber connection according to the fifth embodiment of the present invention. In FIG. 10, reference numerals 100a-1–100a-4 designate respectively first to fourth data transmitters each having the same construction as in the first embodiment. 200a-1–200a-4 designate respectively first to fourth data receivers each having the same construction as in the first embodiment.

From the first data transmitter 100a-1 a data is broadcast-transferred to first and second data receivers 200a-1, 200a-2 via a first outside data bus 30c-1. 20e-1 designates a first error signal line connected in common to the first data transmitter 100a-1 and first and second data receivers 200a-1, 200a-2. From the second data transmitter 100a-2 a data is broadcast-transferred to third and fourth data receivers 200a-3, 200a-4 via a second outside data bus 30c-2. 20e-2 designates a second error signal line connected in common to the second data transmitter 100a-2 and third and fourth data receivers 200a-3, 200a-4. From the third data transmitter 100a-3 a data is broadcast-transferred to first and third data receivers 200a-1, 200a-3 via a third outside data bus 30c-3. 20e-3 designates a third error signal line connected in common to the third data transmitter 100a-3 and first and third data receivers 200a-1, 200a-3. From the fourth data transmitter 100a-4 a data is broadcast-transferred to second and fourth data receivers 200a-2, 200a-4 via a fourth outside data bus 30c-4. 20e-4 designates a fourth error signal line connected in common to the fourth data transmitter 100a-4 and second and fourth data receivers 200a-2, 200a-4. First to fourth error signal lines 20e-1 - 20e-4 are connected to the power source line via the pull-up resistor 50 respectively.

Each of first to fourth data transmitters 100a-1–100a-4 has a function of transmitting a test data as a broadcast data. For example, when first and second data transmitters 100a-1, 100a-2 transmit a test data concurrently, the test data transmitted from the first data transmitter 100a-1 is received by first and second data receivers 200a-1, 200a-2 individually and the test data transmitted from the second data transmitter 100a-2 is received by third and fourth data receivers 200a-3, 200a-4 individually. At this time, when an error is present in any of the received data in first and second data receivers 200a-1, 200a-2, the potential of the first error signal line 20e-1 is pulled down to LOW. Accordingly, the first data transmitter 100a-1 re-transmits the identical test data, recognizing an error occurrence. When the re-transmitting of the identical test data is counted to a set number of times, the first data transmitter 100a-1 judges that the data transfer system has a permanent failure in a part regarding first and second data receivers 200a-1, 200a-2. Similarly, the second data transmitter 100a-2 checks whether a permanent failure is present in a part regarding third and fourth data receivers 200a-3, 200a-4. The same operation is carried out in case where a test data is broad-cast-transferred from third and fourth data transmitters 100a-3, 100a-4.

As described above, according to this embodiment, since test results of the plural data receivers are obtained at one time via the error signal lines by the broadcast transfer of the test data, the data transfer system is tested in high speed. In addition, by counting the times of re-transmitting of the test data, a permanent failure of the data transfer system is detected in high speed, apart from a sudden failure due to a crosstalk and the like.

We claim:

1. A data transfer device comprising:

one data transmitter for transmitting a broadcast data and for re-transmitting said broadcast data in response to an error judgement signal:

a plurality of data receivers, each of said data receivers individually receiving said broadcast data from said data transmitter, and individually detecting whether an error is present in the received data, and if an error is present, the data receiver detecting the presence of the error provides an error judgement signal and discards the received broadcast data having an error; and a single error line connected in common to said data transmitter and each of said data receivers for providing said error judgement signal concurrently to said data transmitter and each of said data receivers, which do not detect the presence of an error in the received broadcast data, wherein each of said data receivers, which do not detect the presence of an error in the received broadcast data, discards the received broadcast data in response to said error judgement signal provided by any of said data receivers via said error line, and wherein said data transmitter re-transmits the broadcast data in response to said error judgement signal provided by any of said data receivers via said error line so that the broadcast data is re-received by all of said data receivers.

2. The data transfer device according to claim 1, wherein said data transmitter includes:

memory means for storing a data to be transmitted;

code adding means for adding an error checking code to a data fetched from said memory means;

transmitting means for temporarily holding a data to which an error checking code is added by said code adding means and for transmitting the data as a broadcast data; and transmitting control means for controlling data fetch from said memory means so as to inhibit from fetching a next data and controlling operation of said transmitting means so that the data held in said transmitting means is re-transmitted when an error detection as to the data which is transmitted by said transmitting means is notified from any of said data receivers.

3. The data transfer device according to claim 1, wherein each of said data receivers includes:

receiving means for receiving a broadcast data transmitted by said data transmitter and temporarily holding the received data;

error checking means for checking whether an error is present in the received data and for outputting an error detection signal when an error is detected;

memory means for storing the received data;

receiving control means for controlling transit of the received data from said receiving means to said memory means so as to inhibit the received data from being stored and outputting an error judgment signal when said error checking means outputs the error detection signal; and connecting means for driving said error signal line so as to notify an error detection concurrently to said data transmitter and all of said data receivers when said receiving control means outputs an error judgment signal, and providing a re-receiving request signal to said receiving control means when said error signal line is driven by any of the other data receivers, wherein said receiving control means has a function of controlling transit of a received data from said receiving means to said memory means so as to inhibit the received data from being stored when the re-receiving request signal is received from said connecting means even though said error checking means does not output an error detection signal.

4. The data transfer device according to claim 3, further comprising a pull-up resistor intervened between said error signal line and a source line, wherein said connecting means in each of the data receivers includes:

a drive part for pulling down an electric potential of said error signal line when said receiving control means outputs the error judgment signal; and an input part for generating a re-receiving request signal to said receiving control means when the electric potential of said error signal line is pulled down.

5. The data transfer device according to claim 1, wherein said data transmitter has functions of transmitting a test data as a broadcast data, and of re-transmitting the test data so that the test data is re-received by all of said data receivers when an error detection as to the transmitted data is notified from any of said data receivers.

6. The data transfer device according to claim 5, wherein said data transmitter has a function of judging that a permanent failure is present in said data transfer device when re-transmission of the test data is counted to a set number of times.

7. A data transfer device, comprising:

one data transmitter for transmitting a broadcast data;

receiving parts, whose number is "n", each including a plurality of data receivers each having a function of receiving individually a broadcast data transmitted by said data transmitter and checking individually whether an error is present in the received data, and a single error signal line connected in common to said data receivers;

integration means, whose number is "n", each connected to said error signal line of each of said "n" receiving parts; and a single error integration signal line connected in common to said data transmitter and each of said "n" integration means, wherein each of said data receivers has functions of discarding the received data and notifying an error detection concurrently to said data transmitter and the other data receivers via said error signal lines, said error integration signal line and said "n" integration means when an error is detected in the received data, and of discarding the received data when an error detection is notified from any of the other data receivers, and said data transmitter has a function of re-transmitting the data so that the broadcast data is received by all of the data receivers when an error detection as to the transmitted broadcast data is notified from any of said data receivers.

8. The data transfer device according to claim 7, wherein each of said "n" receiving parts includes a pull-up resistor intervened between said error signal line and a power source line, and each of said data receivers includes a drive part for pulling down, when an error is detected in the received data, an electric potential of one corresponding error signal line, and an input part for generating a re-receiving request signal when the electric potential of the corresponding error signal line is pulled down.

9. The data transfer device according to claim 8, further comprising, a pull-down resistor intervened between said error integration signal line and a grounding line, wherein each of said "n" integration means includes a first switching element for pulling up an electric potential of said error integration line when one corresponding error signal line of each of error signal lines of said "n" receiving parts is pulled down, and a second switching element for pulling down the electric potential of the corresponding error signal line when the electric potential of said error integration signal line is pulled up.

10. A data transferring method for transferring a broadcast data from one data transmitter to each of a plurality of data receivers and for re-transmitting said broadcast data in response to an error judgement signal, comprising the steps of:

transmitting a broadcast data from a data transmitter;

receiving individually said broadcast data by a plurality of data receivers;

detecting whether an error is present in the received broadcast data by each of the plurality of data receivers individually;

providing an error judgement signal, when any of the data receivers detects an error in the received data, concurrently to the data transmitter and all of the other data receivers via a single error signal line, which do not detect the presence of an error in the received broadcast data;

discarding the received broadcast data having an error in response to an error judgement signal or to the detection of an error; and re-transmitting the broadcast data from the data transmitter in response to said error judgement signal provided by any of said data receivers so that the broadcast data detected as having an error present is re-received by all the data receivers.

11. The data transferring method according to claim 10, further comprising the step of storing a received data in each of the data receivers when none of the data receivers detects an error in the received data.

12. The data transferring method according to claim 10, further comprising the step of discarding a received data in all of the data receivers when any of the data receivers detects and error in the received data.

* * * * *